United States Patent
Xu et al.

(10) Patent No.: US 11,822,040 B2
(45) Date of Patent: Nov. 21, 2023

(54) SECURITY SCANNING INSPECTION SYSTEM AND METHOD

(71) Applicants: TSINGHUA UNIVERSITY, Beijing (CN); NUCTECH (BEIJING) COMPANY LIMITED, Beijing (CN); NUCTECH COMPANY LIMITED, Beijing (CN)

(72) Inventors: Yanwei Xu, Beijing (CN); Weifeng Yu, Beijing (CN); Yu Hu, Beijing (CN); Chunguang Zong, Beijing (CN); Shangmin Sun, Beijing (CN)

(*) Notice: Subject to any disclaimer, the term of this patent is extended or adjusted under 35 U.S.C. 154(b) by 238 days.

(21) Appl. No.: 17/255,394

(22) PCT Filed: Jan. 6, 2020

(86) PCT No.: PCT/CN2020/070470
§ 371 (c)(1),
(2) Date: Dec. 22, 2020

(87) PCT Pub. No.: WO2020/140997
PCT Pub. Date: Jul. 9, 2020

(65) Prior Publication Data
US 2021/0270991 A1 Sep. 2, 2021

(30) Foreign Application Priority Data
Jan. 4, 2019 (CN) .......................... 201910009034.X

(51) Int. Cl.
*G01S 17/894* (2020.01)
*G01V 5/00* (2006.01)
(52) U.S. Cl.
CPC .......... *G01V 5/0016* (2013.01); *G01S 17/894* (2020.01); *G06V 2201/08* (2022.01)
(58) Field of Classification Search
CPC . G01V 5/0016; G01S 17/894; G06V 2201/08
See application file for complete search history.

(56) References Cited

U.S. PATENT DOCUMENTS

| 2004/0086078 A1* | 5/2004 | Adams ................. G01V 5/0025 378/57 |
| 2004/0258198 A1 | 12/2004 | Carver et al. |
| 2009/0290757 A1* | 11/2009 | Mian .................... G06V 20/653 382/104 |

FOREIGN PATENT DOCUMENTS

| CN | 103149599 A | 6/2013 |
| CN | 103984035 A | 8/2014 |

(Continued)

OTHER PUBLICATIONS

European Search Report dated Jan. 21, 2022 regarding Application No. 20736161.9.

(Continued)

*Primary Examiner* — David P Porta
*Assistant Examiner* — Fani Polyzos Boosalis
(74) *Attorney, Agent, or Firm* — KILPATRICK TOWNSEND & STOCKTON, LLP

(57) ABSTRACT

The present disclosure relates to a security scanning inspection system and method. The security scanning inspection system comprises a detector, a scanning device and a controller, wherein the detector is configured to detect a protective attribute of an object to be inspected; the scanning device is movably arranged and the scanning device is configured to emit a scanning ray during movement to perform a security scanning inspection on the object to be inspected, the scanning device comprising at least two working modes, wherein a dose of a scanning ray in each working mode is different from a dose of a scanning ray in any other working modes; and the controller configured to select a working mode of the scanning device according to the protective attribute of the object to be inspected detected by the detector.

10 Claims, 2 Drawing Sheets

(56) References Cited

FOREIGN PATENT DOCUMENTS

| | | | |
|---|---|---|---|
| CN | 104090308 A | 10/2014 | |
| CN | 104374785 A | 2/2015 | |
| CN | 104391338 A | 3/2015 | |
| CN | 104459813 A | 3/2015 | |
| CN | 105022095 A | 11/2015 | |
| CN | 105333826 A | 2/2016 | |
| CN | 206074479 U | 4/2017 | |
| CN | 107664774 A | 2/2018 | |
| CN | 108445546 A | 8/2018 | |
| CN | 207689689 U | 8/2018 | |
| CN | 209327592 U | 8/2019 | |
| EP | 3035245 A1 | 6/2016 | |
| EP | 3176611 A1 | 6/2017 | |
| EP | 3178719 A | 6/2017 | |
| EP | 3273275 A1 * | 1/2018 | ............... G01V 5/00 |
| WO | 2012106730 A2 | 8/2012 | |
| WO | 2016158573 A1 | 10/2016 | |
| WO | 2017068370 A2 | 4/2017 | |

OTHER PUBLICATIONS

First office action dated May 24, 2023 for the CN priority No. 201910009034.X.

* cited by examiner

SECURITY SCANNING INSPECTION SYSTEM AND METHOD

CROSS-REFERENCES TO RELATED APPLICATIONS

The present is a national phase application of International Application No. PCT/CN2020/070470, which claims priority to Chinese patent application No. 201910009034.X, filed on Jan. 4, 2019, the disclosure of which is hereby incorporated in its entirety.

FIELD

The present disclosure relates to the technical field of security scanning inspections, and in particular to a security scanning inspection system and method.

BACKGROUND

At present, in the field of security inspection, an X-ray security scanning inspection system is usually used to perform a security inspection on passing vehicles to ensure the safety of the items carried by the vehicles. However, frequent irradiation by X-rays can cause a serious harm to the human body. Therefore, to protect a driver who drives a vehicle, the driver needs to be avoided when a security scanning inspection is performed on the vehicle.

At present, a general method is that the driver drives the vehicle to an inspection position, and then the driver leaves a cab before the security scanning inspection is performed on the vehicle.

In the related art, to improve the inspection efficiency, some inspection devices can implement a security scanning inspection process while the driver does not leave the vehicle in the situation where the cab is in the front and freight is in the rear.

It should be noted that the information disclosed in the background section of the present disclosure is only intended to enhance understanding of the general background of the present disclosure, and should not be considered as an admission or any form of suggestion that the information constitutes related technology.

BRIEF SUMMARY OF THE DISCLOSURE

According to an aspect of the present disclosure, a security scanning inspection system is provided, including:
  a detector, configured to detect a protective attribute of an object to be inspected;
  a scanning device, movably arranged to emit a scanning ray during movement to perform a security scanning inspection on the object to be inspected, the scanning device having at least two working modes, wherein a dose of a scanning ray in each working mode is different from a dose of a scanning ray in any other working modes; and
  a controller configured to select a working mode of the scanning device according to the protective attribute of the object to be inspected detected by the detector.

In some embodiments, the detector is configured to detect the object to be inspected comprising at least two sections with different protective attributes, and the controller switches the working mode of the scanning device in real time when the detector detects a change in the protective attribute of the object to be inspected.

In some embodiments, the scanning device has a first working mode, a second working mode and a third working mode, wherein a ray dose of the scanning device in the first working mode is greater than a ray dose of the scanning device in the second working mode, and a ray dose of the scanning device in the third working mode is zero.

In some embodiments, the object to be inspected includes a vehicle head section and a vehicle body section; and the controller detects the vehicle body section and then detects the vehicle head section, and adjusts the working mode of the scanning device to the first working mode when the vehicle body section is detected, and adjusts the working mode of the scanning device to the second working mode or the third working mode when the vehicle head section is detected.

In some embodiments, the object to be inspected includes a locomotive section, a passenger section and a freight section, and the controller is configured to perform detection in the order of the locomotive section, the passenger section and the freight section, and adjust the working mode of the scanning device to the second working mode or the third working mode when the locomotive section is detected, adjust the working mode of the scanning device to the first working mode when the freight section is detected, and adjust the working mode of the scanning device to the second working mode or the third working mode when the passenger section is detected.

In some embodiments, the object to be inspected includes a locomotive section, a passenger section and a freight section, and the controller is configured to perform detection in the order of the freight section, the passenger section and the locomotive section, and adjust the working mode of the scanning device to the second working mode or the third working mode when the passenger section is detected, adjust the working mode of the scanning device to the first working mode when the freight section is detected, and adjust the working mode of the scanning device to the second working mode or the third working mode when the locomotive section is detected.

In some embodiments, the detector includes a vehicle type identification device, which is configured to identify a vehicle type of the object to be inspected and determine a protective attribute of the object to be inspected.

In some embodiments, the vehicle type identification device includes a wheelbase measurement device and a vehicle type confirmation device; the wheelbase measurement device is configured to measure a wheelbase of the object to be inspected; and the vehicle type confirmation device is configured to determine the vehicle type of the object to be inspected according to the wheelbase measured by the wheelbase measurement device.

In some embodiments, the vehicle type identification device includes an image photographing device and a vehicle type confirmation device; the image photographing device is configured to photograph an image of the object to be inspected; and the vehicle type confirmation device is configured to determine the vehicle type of the object to be inspected according to the image photographed by the image photographing device.

In some embodiments, the vehicle type identification device includes a laser scanner and a vehicle type confirmation device; the laser scanner is configured to scan the object to be inspected and acquire a three-dimensional image of the object to be inspected; and the vehicle type confirmation device is configured to determine the vehicle type of the object to be inspected according to the three-dimensional image scanned by the laser scanner.

According to another aspect of the present disclosure, a security scanning inspection method is provided, including:

detecting a protective attribute of an object to be inspected;

selecting a working mode of a scanning device according to the protective attribute of the object to be inspected, the scanning device having at least two working modes, wherein a dose of a scanning ray in each working mode is different from a dose of a scanning ray in any other working modes; and in a selected working mode, the scanning device emits a scanning ray during movement to perform a security scanning inspection on the object to be inspected.

In some embodiments, the operation of selecting a working mode of a scanning device according to the protective attribute of the object to be inspected includes:

In the case where the object to be inspected comprises at least two sections with different protective attributes, switching the working mode of the scanning device in real time when detecting a change in the protective attribute of the object to be inspected.

In some embodiments, the scanning device has a first working mode, a second working mode and a third working mode, wherein a ray dose of the scanning device in the first working mode is greater than a ray dose of the scanning device in the second working mode, and a ray dose of the scanning device in the third working mode is zero.

In some embodiments, the operation of detecting a protective attribute of an object to be inspected includes:

In the case where the object to be inspected includes a vehicle head section and a vehicle body section, detecting a protective attribute of the vehicle body section and then detecting a protective attribute of the vehicle head section; and the operation of selecting a working mode of a scanning device according to the protective attribute of the object to be inspected includes:

adjusting the working mode of the scanning device to the first working mode when the vehicle body section is detected, and adjusting the working mode of the scanning device to the second working mode or the third working mode when the vehicle head section is detected.

In some embodiments, the operation of detecting a protective attribute of an object to be inspected includes:

in the case where the object to be inspected includes a locomotive section, a passenger section and a freight section, detecting a protective attribute of the locomotive section then detecting a protective attribute of the passenger section, and finally detecting a protective attribute of the freight section; and the operation of selecting a working mode of a scanning device according to the protective attribute of the object to be inspected includes:

adjusting the working mode of the scanning device to the second working mode or the third working mode when the locomotive section is detected, adjusting the working mode of the scanning device to the second working mode or the third working mode when the passenger section is detected, and adjusting the working mode of the scanning device to the first working mode when the freight section is detected.

In some embodiments, the operation of detecting a protective attribute of an object to be inspected includes:

in the case where the object to be inspected includes a locomotive section, a passenger section and a freight section, detecting a protective attribute of the freight section, then detecting a protective attribute of the passenger section, and finally detecting a protective attribute of the locomotive section; and the operation of selecting a working mode of a scanning device according to the protective attribute of the object to be inspected includes:

adjusting the working mode of the scanning device to the first working mode when the freight section is detected, adjusting the working mode of the scanning device to the second working mode or the third working mode when the passenger section is detected, and adjusting the working mode of the scanning device to the second working mode or the third working mode when the locomotive section is detected.

Based on the above technical solutions, by providing the detector in the present disclosure, the protective attribute of the object to be inspected can be detected, so that the controller can select the working mode of the scanning device according to the protective attribute of the object to be inspected, thereby achieving the effect of adopting different working modes for different protective attributes; this can adapt to the situation where a cab is in the front or in the rear, and also adapt to the situation where a locomotive is combined with a passenger carriage and a freight carriage, so that the adaptability to the object to be inspected is improved, and the scope of application of the security scanning inspection system is expanded.

Other features and advantages of the present disclosure will become apparent from the following detailed description of exemplary embodiments of the present disclosure with reference to the accompanying drawings.

BRIEF DESCRIPTION OF THE DRAWINGS

To more clearly describe technical solutions in the embodiments of the present disclosure or in the related art, a brief introduction to the drawings for use in description of the embodiments or the related art will be given below. Apparently, the drawings described below are only some embodiments of the present disclosure.

DETAILED DESCRIPTION OF THE DISCLOSURE

Figure 1:
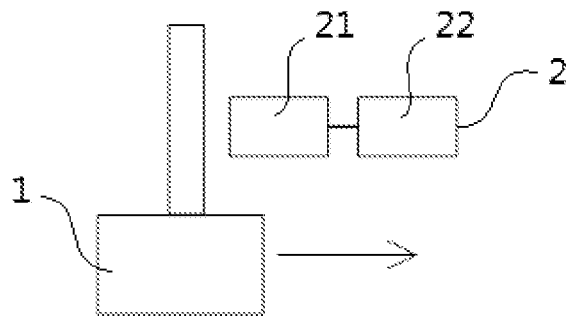
FIG. 1 is an inspection diagram of some embodiments of a security scanning inspection system in the present disclosure.

The technical solutions in the embodiments will be described clearly and completely below in conjunction with the accompanying drawings in the embodiments of the present disclosure. The described embodiments are only a part of the embodiments of the present disclosure, and not all the embodiments.

In description of the present disclosure, it needs to the understood that orientation or position relations denoted by the terms "center", "transverse", "longitudinal", "front", "rear", "left", "right", "upper", "lower", "vertical", "horizontal", "top", "bottom", "inner", "outer" and the like are orientation or position relations based on illustration in the figures, are only intended to facilitate describing the present disclosure and simplifying description, instead of indicating or implying the denoted devices or elements must have specific orientations and be constructed and operated in specific orientations, and thus they cannot be understood as limiting the protection scope of the present disclosure.

The inventor has found through research that the avoidance effect of detectors in actual applications in related technology is not very good, and the problem of missed inspection often occurs; moreover, inspection devices can achieve avoidance only in the situation where a cab is in the front and cargo is in the rear, but cannot achieve avoidance very well in the situation where a cab is in the rear and cargo is in the front, and in the situation where a locomotive is combined with a passenger carriage and a freight carriage.

As shown in FIGS. 1 to 5, in an embodiment of a security scanning inspection system provided by the present disclosure, the security scanning inspection system includes a detector, a scanning device 1 and a controller, wherein the detector is configured to detect a protective attribute of an object to be inspected 2, 2'; the scanning device 1 is movably arranged and the scanning device 1 is configured to emit a scanning ray during movement to perform a security scanning inspection on the object to be inspected 2, 2', the scanning device 1 having at least two working modes, wherein a dose of a scanning ray in each working mode is different from a dose of a scanning ray in any other working modes; and the controller configured to select a working mode of the scanning device 1 according to the protective attribute of the object to be inspected 2, 2' detected by the detector.

In the above embodiment, by providing the detector, the protective attribute of the object to be inspected can be detected, so that the controller can select the working mode of the scanning device according to the protective attribute of the object to be inspected, thereby achieving the effect of adopting different working modes for different protective attributes; in this way, an object to be inspected that needs to be avoided can be avoided effectively, and an object to be inspected that needs to be detected can be detected timely and accurately to avoid a missed inspection; this can adapt to the situation where a cab is in the front or in the rear, and also adapt to the situation where a locomotive is combined with a passenger carriage and a freight carriage, so that the adaptability to the object to be inspected is improved, and the scope of application of the security scanning inspection system is expanded.

Moreover, in the above embodiment, the scanning device 1 is movably arranged; that is, the scanning device 1 is movable, so that during a security scanning inspection, the object to be inspected can be kept stationary while the scanning device 1 moves relative to the object to be inspected; or the object to be inspected also moves, and a moving speed of the scanning device 1 is different from that of the object to be inspected. Compared with a solution in which a scanning device is stationary while an object to be inspected moves, the embodiment of the present disclosure can avoid blocking a security scanning inspection channel, reducing the effect of the security scanning inspection, and causing problems such as an inspection failure, due to a movement error or failure of the object to be inspected, effectively ensure the reliability of the security scanning inspection and improve the efficiency of the security scanning inspection.

In some embodiments, the detector is configured to detect the object to be inspected 2, 2' comprising at least two sections with different protective attributes, and the controller switches the working mode of the scanning device 1 in real time when the detector detects a change in the protective attribute of the object to be inspected 2, 2'. This has the advantages that targeted inspections on objects under inspection with different protective attributes can be achieved more accurately, and objects that need to be avoided are effectively protected while preventing missed inspections, improving the safety of the security scanning inspections, and also being conducive to improving the efficiency of the security scanning inspections.

In some embodiments, the scanning device 1 has a first working mode, a second working mode and a third working mode, wherein a ray dose of the scanning device 1 in the first working mode is greater than a ray dose of the scanning device 1 in the second working mode, and a ray dose of the scanning device 1 in the third working mode is zero.

As shown in FIG. 1, the object to be inspected 2 includes a vehicle head section 22 and a vehicle body section 21; and the controller detects the vehicle body section 21 and then detects the vehicle head section 22, and adjusts the working mode of the scanning device 1 to the first working mode when the vehicle body section 21 is detected, and adjust the working mode of the scanning device 1 to the second working mode or the third working mode when the vehicle head section 22 is detected. In this way, an object to be inspected that enters a scanning channel backwardly can also be detected successively.

Figure 2:
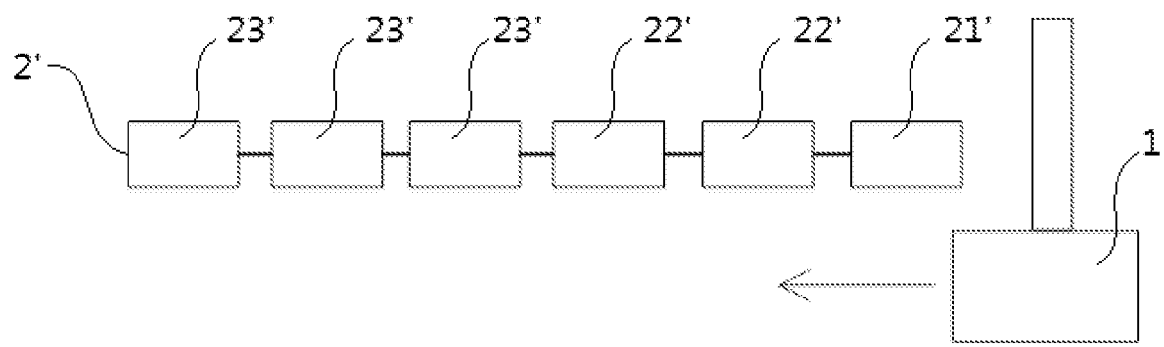
FIG. 2 is an inspection diagram of some other embodiments of the security scanning inspection system in the present disclosure.

As shown in FIG. 2, the object to be inspected 2' includes a locomotive section 21', passenger sections 22' and freight sections 23', and the controller is configured to perform detection in the order of the locomotive section 21', the passenger sections 22' and the freight sections 23', and adjust the working mode of the scanning device 1 to the second working mode or the third working mode when the locomotive section 21' is detected, adjust the working mode of the scanning device 1 to the first working mode when a freight section 23' is detected, and adjust the working mode of the scanning device 1 to the second working mode or the third working mode when a passenger section 22' is detected. In this way, a train set combined different types of carriages can also be detected successively.

Figure 3:
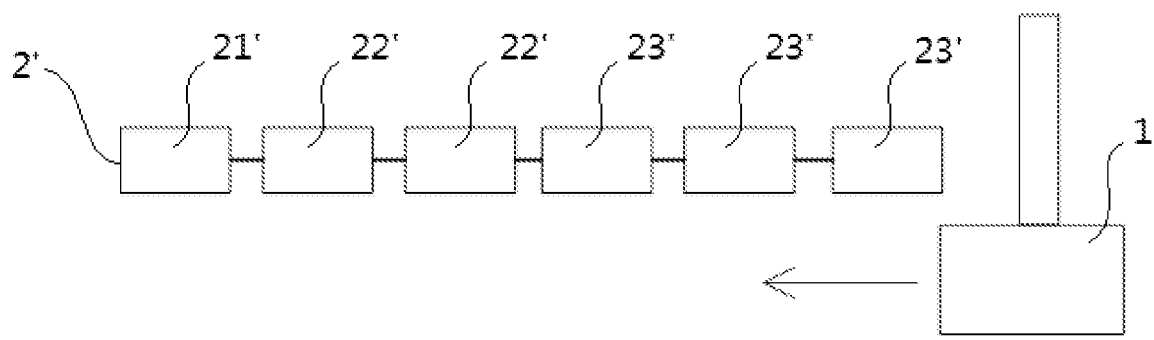
FIG. 3 is an inspection diagram of yet other embodiments of the security scanning inspection system in the present disclosure.

As shown in FIG. 3, the object to be inspected 2' includes a locomotive section 21', passenger sections 22' and freight sections 23', and the controller is configured to perform detection in the order of the freight sections 23', the passenger sections 22' and the locomotive section 21', and adjust the working mode of the scanning device 1 to the second working mode or the third working mode when a passenger section 22' is detected, adjust the working mode of the scanning device 1 to the first working mode when a freight section 23' is detected, and adjust the working mode of the scanning device 1 to the second working mode or the third working mode when the locomotive section 21' is detected.

Figure 4:
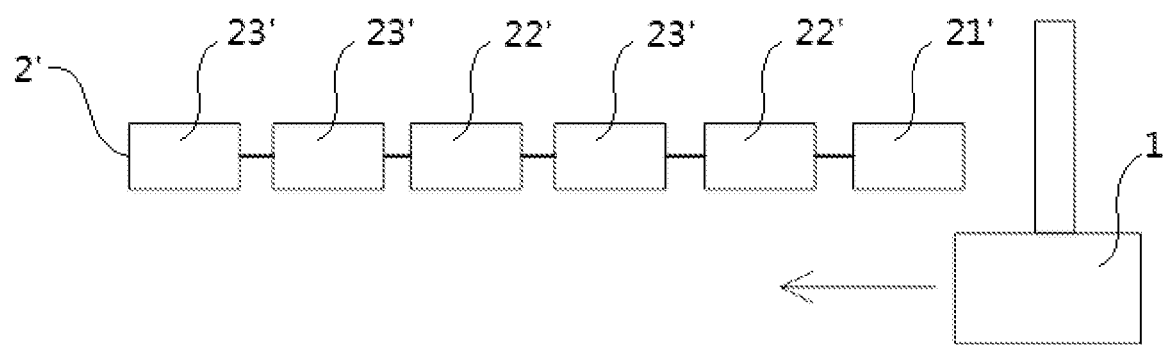
FIG. 4 is an inspection diagram of still other embodiments of the security scanning inspection system in the present disclosure.
Figure 5:
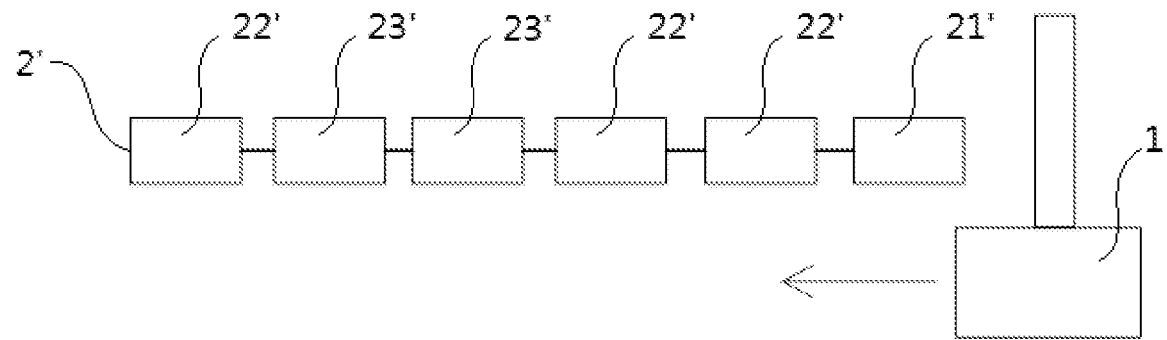
FIG. 5 is an inspection diagram of still yet other embodiments of the security scanning inspection system in the present disclosure.

Of course, in addition to the combined train sets as shown in FIGS. 2 and 3, in other embodiments, the combined train set may also be arranged as shown in FIGS. 4 and 5. For such combined train sets, the detector detects each vehicle section, and the controller adjusts the vehicle section to the corresponding working mode according to the protective attribute of the vehicle section, so that effective avoidance is achieved and missed inspections can be avoided.

In addition to a difference between a vehicle head and a vehicle body, and a difference between a locomotive, a passenger carriage and a freight carriage, the embodiment of the security scanning inspection system of the present disclosure may also adapt to the object to be inspected 2 based on a difference in vehicle type, such as an engineering vehicle or a special vehicle, and it may also adjust such vehicles to different working modes based on their protective attributes.

Moreover, the working modes are not limited to the aforementioned three modes, and there may also are working modes in which ray doses have other values.

In some embodiments, the detector includes a vehicle type identification device, which is configured to identify a vehicle type of the object to be inspected 2, 2' and determine a protective attribute of the object to be inspected 2, 2' according to the vehicle type. Determining the protective attribute of the object to be inspected according to the vehicle type is a relatively accurate and reliable judgment method, which effectively protects the object to be inspected that needs to be avoided.

In some embodiments, the vehicle type identification device includes a wheelbase measurement device and a vehicle type confirmation device; the wheelbase measurement device is configured to measure a wheelbase of the object to be inspected 2, 2; and the vehicle type confirmation device is configured to determine the vehicle type of the object to be inspected 2, 2' according to the wheelbase measured by the wheelbase measurement device.

In some embodiments, the vehicle type identification device includes an image photographing device and a vehicle type confirmation device; the image photographing device is configured to photograph an image of the object to be inspected 2, 2; and the vehicle type confirmation device is configured to determine the vehicle type of the object to be inspected 2, 2' according to the image photographed by the image photographing device.

In some embodiments, the vehicle type identification device includes a laser scanner and a vehicle type confirmation device; the laser scanner is configured to scan the object to be inspected 2, 2' and acquire a three-dimensional image of the object to be inspected 2, 2; and the vehicle type confirmation device is configured to determine the vehicle type of the object to be inspected 2, 2' according to the three-dimensional image scanned by the laser scanner.

Of course, in addition to the aforementioned three methods, other feasible methods may also be used in other embodiments to determine the vehicle type of the object to be inspected.

From the description of multiple embodiments of the security scanning inspection system of the present disclosure, it can be seen the embodiments of the security scanning inspection system of the present disclosure have at least one or more of the following advantages:

1. a protective attribute of an object to be inspected is detected by a detector, and then a controller adjusts a working mode of a scanning device according to the protective attribute of the object to be inspected; in this way, an object that needs to be avoided can be effectively avoided, and at the same time a missed inspection of an object that needs to be inspected is avoided;
2. it can adapt to the situation where a cab is in the front and the situation where a cab is in the rear, and also adapt to a situation of a locomotive, a passenger carriage and a freight carriage are in a combined arrangement, which improves the adaptability to the object to be inspected and expands the scope of application;
3. by switching the working mode in real time, a driver's safety is effectively ensured, a missed inspection is avoided and it is also conducive to improving the efficiency of the security scanning inspection; and
4. it can automatically respond to complex situations, improve the intelligence of the system, and effectively ensure safe and reliable operation of the system.

The present disclosure also provides a security scanning inspection method, including:
   detecting a protective attribute of an object to be inspected 2, 2;
   adjusting a working mode of a scanning device 1 according to the protective attribute of the object to be inspected 2, 2', the scanning device 1 having at least two working modes, wherein a dose of a scanning ray in each working mode is different from a dose of a scanning ray in any other working modes; and
   in a selected working mode, emitting a scanning ray by the scanning device 1 during movement to perform a security scanning inspection on the object to be inspected 2, 2'.

In some embodiments, the operation of adjusting a working mode of a scanning device 1 according to the protective attribute of the object to be inspected 2, 2' includes:
   In the case where the object to be inspected 2, 2' comprising at least two sections with different protective attributes, switching the working mode of the scanning device 1 in real time when detecting a change in the protective attribute of the object to be inspected 2, 2'.

In some embodiments, the scanning device 1 has a first working mode, a second working mode and a third working mode, wherein a ray dose of the scanning device 1 in the first working mode is greater than a ray dose of the scanning device 1 in the second working mode, and a ray dose of the scanning device 1 in the third working mode is zero.

In some embodiments, the operation of detecting a protective attribute of an object to be inspected 2, 2' includes:
   in the case where the object to be inspected 2, 2' includes a vehicle head section 22 and a vehicle body section 21, detecting a protective attribute of the vehicle body section 21 and then detecting a protective attribute of the vehicle head section 22; and
   the operation of adjusting a working mode of a scanning device 1 according to the protective attribute of the object to be inspected 2, 2' includes:
   adjusting the working mode of the scanning device 1 to the first working mode when the vehicle body section 21 is detected, and adjusting the working mode of the scanning device 1 to the second working mode or the third working mode when the vehicle head section 22 is detected.

In some embodiments, the operation of detecting a protective attribute of an object to be inspected 2, 2' includes:
   in the case where the object to be inspected 2, 2' includes a locomotive section 21', a passenger section 22' and a freight section 23', detecting a protective attribute of the locomotive section 21', then detecting a protective attribute of the passenger section 22', and finally detecting a protective attribute of the freight section 23; and
   the operation of adjusting a working mode of a scanning device 1 according to the protective attribute of the object to be inspected 2, 2' includes:
   adjusting the working mode of the scanning device 1 to the second working mode or the third working mode when the locomotive section 21' is detected, adjusting the working mode of the scanning device 1 to the second working mode or the third working mode when the passenger section 22' is detected, and adjusting the working mode of the scanning device 1 to the first working mode when the freight section 23' is detected.

In some embodiments, the operation of detecting a protective attribute of an object to be inspected 2, 2' includes:

in the case where the object to be inspected 2, 2' includes a locomotive section 21', a passenger section 22' and a freight section 23', detecting a protective attribute of the freight section 23', then detecting a protective attribute of the passenger section 22', and finally detecting a protective attribute of the locomotive section 21; and the operation of adjusting a working mode of a scanning device 1 according to the protective attribute of the object to be inspected 2, 2' includes:

adjust the working mode of the scanning device 1 to the first working mode when the freight section 23' is detected, adjusting the working mode of the scanning device 1 to the second working mode or the third working mode when the passenger section 22' is detected, and adjusting the working mode of the scanning device 1 to the second working mode or the third working mode when the locomotive section 21' is detected.

The positive technical effects of the security scanning inspection system in the various embodiments described above are also applicable to the security scanning inspection system, and are not repeated here.

What is claimed is:

1. A security scanning inspection system, comprising:
   a detector, configured to detect a protective attribute of an object to be inspected;
   a scanning device, movably arranged to emit a scanning ray during movement to perform a security scanning inspection on the object to be inspected, the scanning device having at least two working modes, wherein a dose of a scanning ray in each working mode is different from a dose of a scanning ray in any other working modes; and
   a controller, configured to select a working mode of the scanning device according to the protective attribute of the object to be inspected detected by the detector;
   wherein the detector is configured to detect the object to be inspected comprising at least two sections with different protective attributes, and the controller switches the working mode of the scanning device in real time when the detector detects a change in the protective attribute of the object to be inspected;
   wherein the scanning device has a first working mode, a second working mode and a third working mode, wherein a ray dose of the scanning device in the first working mode is greater than a ray dose of the scanning device in the second working mode, and a ray dose of the scanning device in the third working mode is zero;
   wherein the object to be inspected comprises a vehicle head section and a vehicle body section; and the controller is configured to detect the vehicle body section and then detect the vehicle head section, and adjust the working mode of the scanning device to the first working mode when the vehicle body section is detected, and adjust the working mode of the scanning device to the second working mode or the third working mode when the vehicle head section is detected.

2. The security scanning inspection system according to claim 1, wherein the object to be inspected comprises a locomotive section, a passenger section and a freight section, and the controller is configured to perform detection in the order of the locomotive section, the passenger section and the freight section, and adjust the working mode of the scanning device to the second working mode or the third working mode when the locomotive section is detected, adjust the working mode of the scanning device to the first working mode when the freight section is detected, and adjust the working mode of the scanning device to the second working mode or the third working mode when the passenger section is detected.

3. The security scanning inspection system according to claim 1, wherein the object to be inspected comprises a locomotive section, a passenger section and a freight section, and the controller is configured to perform detection in the order of the freight section, the passenger section and the locomotive section, and adjust the working mode of the scanning device to the second working mode or the third working mode when the passenger section is detected, adjust the working mode of the scanning device to the first working mode when the freight section is detected, and adjust the working mode of the scanning device to the second working mode or the third working mode when the locomotive section is detected.

4. The security scanning inspection system according to claim 1, wherein the detector comprises a vehicle type identification device, which is configured to identify a vehicle type of the object to be inspected and determine a protective attribute of the object to be inspected according to the vehicle type.

5. The security scanning inspection system according to claim 4, wherein the vehicle type identification device comprises a wheelbase measurement device and a vehicle type confirmation device; the wheelbase measurement device is configured to measure a wheelbase of the object to be inspected; and the vehicle type confirmation device is configured to determine the vehicle type of the object to be inspected according to the wheelbase measured by the wheelbase measurement device.

6. The security scanning inspection system according to claim 4, wherein the vehicle type identification device comprises an image photographing device and a vehicle type confirmation device; the image photographing device is configured to photograph an image of the object to be inspected; and the vehicle type confirmation device is configured to determine the vehicle type of the object to be inspected according to the image photographed by the image photographing device.

7. The security scanning inspection system according to claim 4, wherein the vehicle type identification device comprises a laser scanner and a vehicle type confirmation device; the laser scanner is configured to scan the object to be inspected and acquire a three-dimensional image of the object to be inspected; and the vehicle type confirmation device is configured to determine the vehicle type of the object to be inspected according to the three-dimensional image scanned by the laser scanner.

8. A security scanning inspection method, comprising:
   detecting a protective attribute of an object to be inspected;
   selecting a working mode of a scanning device according to the protective attribute of the object to be inspected, the scanning device having at least two working modes, wherein a dose of a scanning ray in each working mode is different from a dose of a scanning ray in any other working modes; and in a selected working mode, the scanning device emits a scanning ray during movement to perform a security scanning inspection on the object to be inspected;

wherein the operation of selecting a working mode of a scanning device according to the protective attribute of the object to be inspected comprises;

in the case where the object to be inspected comprises at least two sections with different protective attributes, switching the working mode of the scanning device in real time when detecting a change in the protective attribute of the object to be inspected;

wherein the scanning device has a first working mode, a second working mode and a third working mode, wherein a ray dose of the scanning device in the first working mode is greater than a ray dose of the scanning device in the second working mode and a ray dose of the scanning device in the third working mode is zero;

wherein the operation of detecting a protective attribute of an object to be inspected comprises:

in the case where the object to be inspected comprises a vehicle head section and a vehicle body section, detecting a protective attribute of the vehicle body section and then detecting a protective attribute of the vehicle head section; and the operation of selecting a working mode of a scanning device according to the protective attribute of the object to be inspected comprises:

adjusting the working mode of the scanning device to the first working mode when the vehicle body section is detected, and adjusting the working mode of the scanning device to the second working mode or the third working mode when the vehicle head section is detected.

9. The security scanning inspection method according to claim 8, wherein the operation of detecting a protective attribute of an object to be inspected comprises:

in the case where the object to be inspected comprises a locomotive section, a passenger section and a freight section, detecting a protective attribute of the locomotive section, then detecting a protective attribute of the passenger section, and finally detecting a protective attribute of the freight section; and the operation of selecting a working mode of a scanning device according to the protective attribute of the object to be inspected comprises:

adjusting the working mode of the scanning device (1) to the second working mode or the third working mode when the locomotive section is detected, adjusting the working mode of the scanning device to the second working mode or the third working mode when the passenger section is detected, and adjusting the working mode of the scanning device to the first working mode when the freight section is detected.

10. The security scanning inspection method according to claim 8, wherein the operation of detecting a protective attribute of an object to be inspected comprises:

in the case where the object to be inspected comprises a locomotive section, a passenger section and a freight section, detecting a protective attribute of the freight section, then detecting a protective attribute of the passenger section, and finally detecting a protective attribute of the locomotive section; and the operation of selecting a working mode of a scanning device according to the protective attribute of the object to be inspected comprises:

adjusting the working mode of the scanning device to the first working mode when the freight section is detected, adjusting the working mode of the scanning device to the second working mode or the third working mode when the passenger section is detected, and adjusting the working mode of the scanning device to the second working mode or the third working mode when the locomotive section is detected.

* * * * *